INVENTOR
Alexander John Cook
BY Norris & Bateman
ATTORNEYS

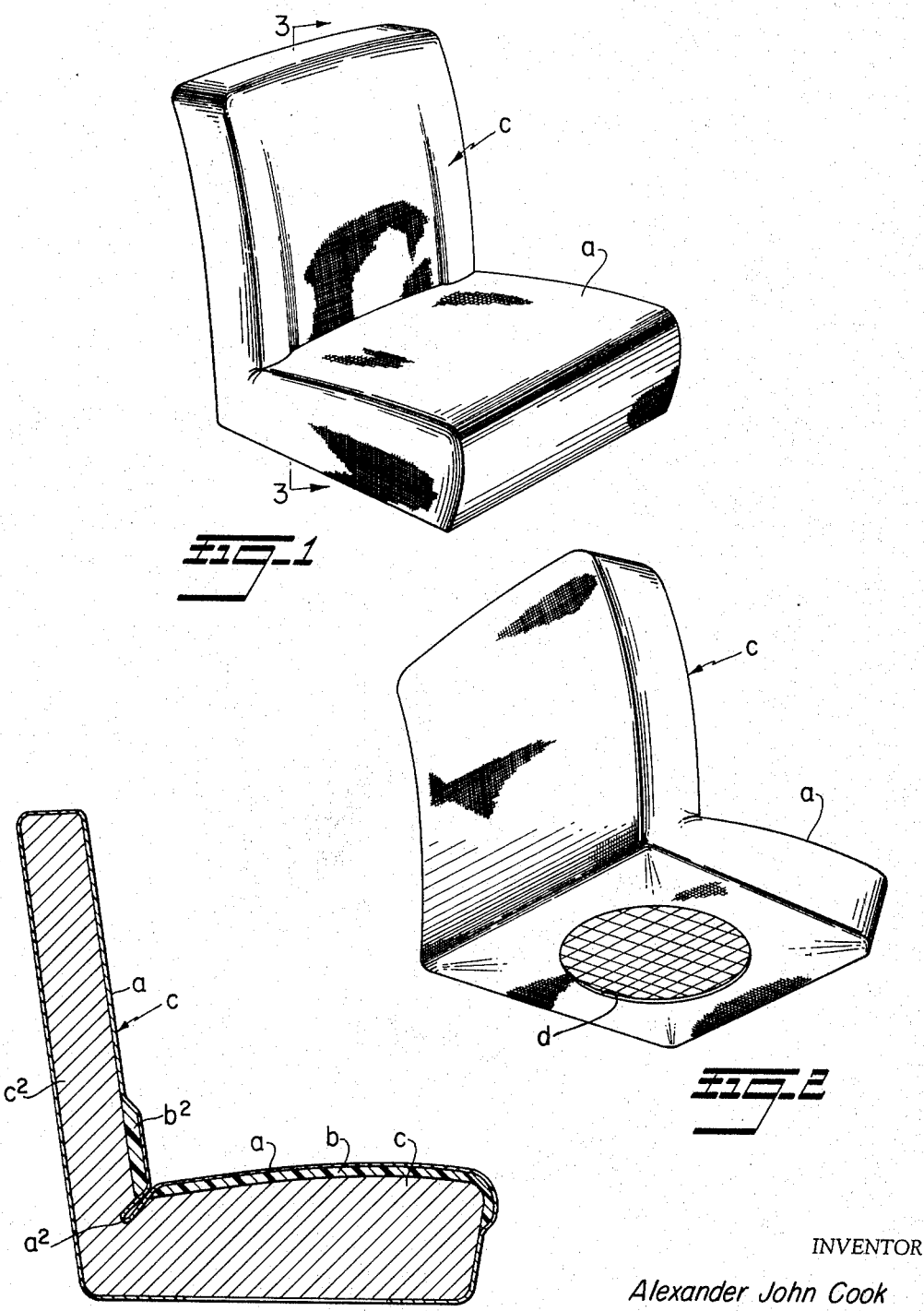

United States Patent Office 3,371,957
Patented Mar. 5, 1968

3,371,957
LOOSE COVERS FOR SEATS AND THE LIKE
Alexander J. Cook, Oldham, England, assignor to Medlock Manufacturing Company Limited, Oldham, England, a company of Great Britain
Filed June 14, 1966, Ser. No. 557,528
Claims priority, application Great Britain, June 17, 1965, 25,780/65
1 Claim. (Cl. 297—219)

ABSTRACT OF THE DISCLOSURE

A loose cover especially for automobile and like seats comprises an envelope for stretchable textile material capable of fitting over the seat and back portions of different size seat assemblies and having a pad of foamed plastic bonded to the underside of the envelope overlying said seat portion to non-slidably grip the seat portion while the remainder of the envelope is free to stretch and slide on the assembly in accord with driver movements and the like. Where the seat assembly is an arm chair, non-slip pads are bonded to the envelope overlying the arms.

---

This invention relates to improvements in loose covers for the cushions of seats, chairs and settees and particularly for the bucket seats of motor vehicles or other transport.

Loose covers have been proposed for the seats of motor vehicles but have proved unsatisfactory owing to the majority of vehicle seats having a leather or imitation leather cushion cover with a smooth and shiny surface.

It has been proposed to construct a loose cover from a foam backed textile material but such covers have to be tailored for each size of seat.

The object of the invention is a loose cover for a chair or vehicle seat or settee having a foam backed seat or base or arm portion to provide a grip on the seat or arm and with unbacked portions of textile material over the remainder of the seat or settee.

According to the invention a pad of a foamed plastic material is bonded to a seat or base portion of a loose cover envelope to grip the cushion cover of a seat the envelope being formed of textile material to envelope the seat, chair or settee.

Figure 4:
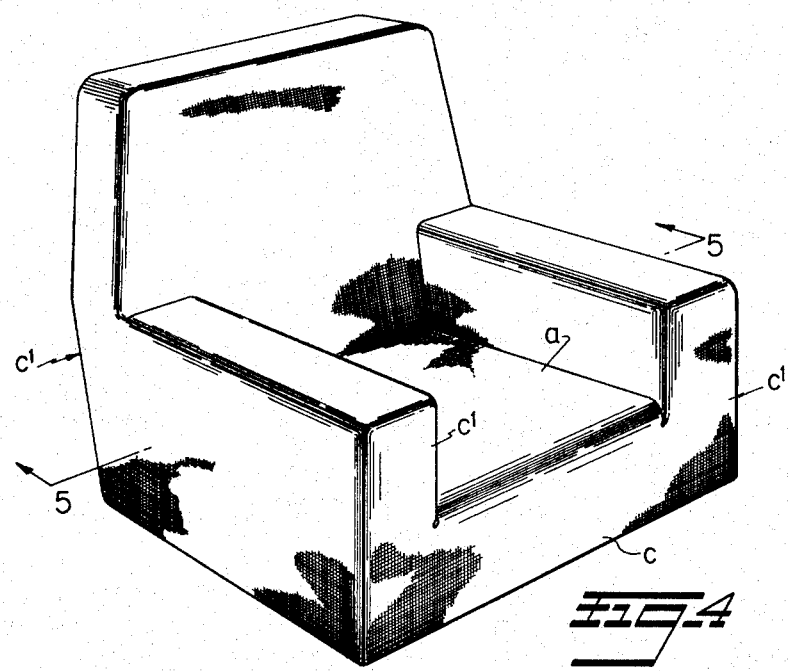
Figure 5:
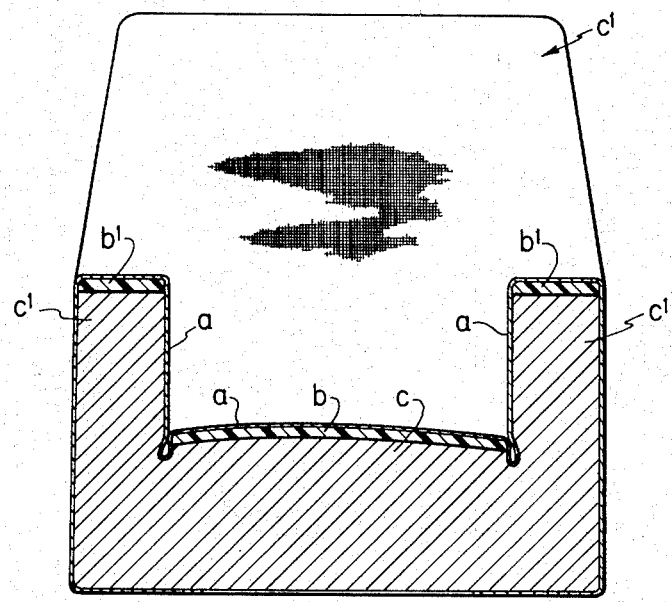

The invention will be described with reference to the accompanying drawings:

FIG. 1 is a perspective view of a vehicle seat.
FIG. 2 is a perspective view of same from below.
FIG. 3 is a vertical section on line 3—3 FIG. 1.
FIG. 4 is a perspective view of an arm chair.
FIG. 5 is a vertical section on line 5—5 FIG. 4.

A loose cover envelope for a seat or base of a chair or vehicle seat C or of a settee $C^1$ is formed of a stretch textile material for example nylon capable of stretching both warp and weftwise. The cover is constructed with an envelope $a$ to enclose the back of the vehicle seat or chair C or settee $C^1$ and with a base portion $c$ of the seat cushion to cover the seat cushion of the seat or chair, a pad $b$ of a foamed plastic material or latex being bonded on the underside of the base portion $a$ of the envelope to provide a grip on the base portion $c$ of the seat or chair or settee cushion.

The foam pad $b$ may be of polyurethane, polyethene, polyester, polyvinyl chloride foam or other foamed plastic material or latex. The pad $b$ is bonded to the base of the loose cover envelope $a$ by an adhesive such as that sold under the trademark Deltaflex.

The portion of the cover envelope $a$ extending under the seat or chair may be provided with an elastic $d$ or cord passing through a hem or loops thereon around the periphery to draw the material taut.

In the case of an arm chair or settee $C^1$ a pad $b^1$ is provided on the underside of the envelope $a$ covering the top of the arm cushion $c^1$ to prevent the cover from slipping thereon.

A loose cover formed of a nylon stretch material provides a cover capable of application to seats or chairs or settees of differing dimensions and may be constructed to be capable of use on a standard bucket seat of different makes of vehicle or on furniture.

The foam pad in contact with the cushion of the bucket seat or chair prevents one of the major drawbacks to car seat covers in that the bottom or base portion or seat of the cover is kept in position, and the cover does not move when the passenger or driver moves in and out of the seat. It also enables a one-piece cover to be made to fit all sizes of seat chairs or settees. The non-slip foam pad, $b$, $b^1$ prevents the cover from riding up. The inclusion of the foam pad $b$, $b^1$ also gives ventilation properties, and keeps the occupant cool, prevents seat shine, and is generally more comfortable than the conventional seating.

The pad $b^2$ may be provided to extend along the lower portion of the back cushion $c^2$ of the seat chair or settee (as shown in FIG. 3) to give support to the lower portion of the back of the person on the seat, chair or settee to prevent draughts from circulating along the junction of the base of the seat cushion and the back cushion thereof.

A portion $a^2$ of the envelope is provided between the pads $b$, $b^2$ gripping the cushion seat and the remainder of the envelope $a$ being free to drape the seat, chair or settee.

What I claim is:

1. A seat cover for a seat assembly having a seat portion and an upstanding back rest portion, said cover comprising a relatively loose envelope extending over said seat and back portions and made of a textile material capable of stretching both warpwise and weftwise to adapt to fit seat assemblies of different dimensions and having surplus textile material to be tucked into the juncture of said seat and back portions, a pad of foamed plastic material bonded to the underside of that part of the envelope which extends over said seat portion to grip said seat portion and prevent relative sliding movement of the cover on said seat portion, and an internal band of foamed plastic material bonded to the lower part of the portion of said cover which extends across the back portion adjacent the juncture of the seat and back portions, said internal band gripping said back portion to prevent relative sliding movement of the cover on the lower part of said back portion while allowing relative sliding movement of the cover on the upper part thereof.

References Cited

UNITED STATES PATENTS

| 1,717,121 | 6/1929 | Sallop | 297—229 |
| 2,366,833 | 1/1945 | Clark | 297—225 |
| 2,744,567 | 5/1956 | Larkin | 297—219 |
| 2,791,268 | 5/1957 | Mendelsohn | 297—229 |

FOREIGN PATENTS

| 744,618 | 2/1956 | Great Britain. |
| 929,026 | 6/1963 | Great Britain. |

FRANCIS K. ZUGEL, *Primary Examiner.*